2,845,350

PROCESS FOR PREPARING STERILIZED CONCENTRATED MILK AND PRODUCT PRODUCED THEREBY

Donald F. Wilcox, Mill Valley, Calif., assignor to Foremost Dairies, Inc., San Francisco, Calif., a corporation of New York No Drawing. Application January 30, 1956
Serial No. 562,036

7 Claims. (Cl. 99—55)

This invention relates to a new and improved process for preparing sterilized concentrated milk and also relates to the product produced by this new process.

Recently, the flavor acceptance of sterilized concentrated milks has been greatly enhanced through the use of improved high-temperature short-time sterilization procedures. The high-temperature short-time sterilization processes used to bring about these improvements also improve the viscosity of the product, in that the viscosity is maintained at a level which is more typical of natural concentrated milk (that is before sterilization of the conventional in-can type) than that ordinarily encountered in conventionally sterilized evaporated milk. With this desired decrease in viscosity, however, has arisen a problem of increased rate of fat separation which, heretofore, has limited the commercial acceptance of such products regardless of their improved flavor characteristics.

A certain procedure has been found to reduce this fat separation in the case of the aseptic canning process wherein the concentrate is homogenized aseptically subsequent to sterilizing and just prior to canning. Although this procedure is effective, it is still necessary to turn the product monthly in order to prevent or to minimize the defect. Hence a more efficient means of controlling fat separation in concentrated milk products sterilizing by high-temperature short-time means is seriously needed.

The usual means of minimizing fat separation in conventionally sterilized concentrated milks is to heat the concentrated milk in such a way as to increase the viscosity quite enormously. Unfortunately, the quantity of heat required in this procedure is productive of a highly cooked and caramelized flavor in the finished product, consequently the potential flavor advantages of the high-temperature short-time sterilization process cannot be realized by practicing the teachings of the prior art.

I have found that other means of increasing viscosity; such as by the addition of a wide variety of stabilizers, will likewise tend to minimize fat separation. To be reasonably effective, however, stabilizers generally must be added in such quantities that, at ordinary storage temperatures of 60–80° F., the viscosity is quite high. When the quantity of stabilizer required to provide the necessary viscosity at 60–80° F. is used, the product will show excessive thickening and livering when subjected to ordinary refrigeration temperatures of 40–50° F. This characteristic is so serious that the indiscriminate use of vegetable stabilizers for the control of fat separation through viscosity control would be unacceptable to the trade.

I have discovered a phenomenon which makes it possible to avoid the use of an excessive quantity of heat and to overcome the above objection to the use of an added stabilizer. I have found that a certain type of vegetable stabilizer has a specific and unique ability to control fat separation at such low levels of usage that the viscosity of the product at ordinary temperatures is almost unchanged. Furthermore, the level required is so low that the product does not thicken and undergo livering at refrigeration temperatures.

The vegetable gum which I find very effective in this application is an extract of the seaweed *Chondrus crispus*, also commonly known as Irish moss, carrageen, pearl moss, rocksalt moss, killeen, pigwrack, carrageen and a number of other names. Suitable extracts are commercially available and may be prepared in a number of ways depending upon the preference of the manufacturer but these are usually the result of one or more hot or cold water extractions followed by alcohol or ether precipitation and drying. The exact composition of the extract is not known but it is generally recognized as being composed of from approximately 70% to approximately 80% of a pectin or a pectin-like carbohydrate complex and from approximately 6% to approximately 8% protein as the major constituents.

Although I have not yet discovered the exact physicochemical principle upon which the unique fat emulsion stabilizing action is founded, the behavior is such that it appears as though the gum, either alone or in combination with one or more of the normal milk constituents, surrounds each butterfat globule in such a way as to decrease its tendency to concentrate or rise toward the top. This might result from setting up stronger double layer charges on the fat globules so that they repel each other effectively and resist concentration in a high fat or cream layer. Another possibility is that the fat stabilizing action may result from an interaction with the milk protein or other milk constituents to the end that a complex is formed which stabilizes the fat emulsion.

The particular concentrations at which extracts of carrageen are effective in bringing about the fat stabilizing action disclosed herein will depend somewhat upon the degree of purity of the extract and to some extent upon the specific method employed in extracting the gum from the seaweed. In general, it has been found that extracts of sufficient purity to be classed as food grade are effective in concentrations ranging from approximately 0.005 to 0.02 percent by weight of the concentrated high-temperature short-time sterilized milk. However, it must be recognized that the exact concentration will depend to a considerable extent upon the particular carrageen extract employed and, therefore, some latitude in the range of concentrations employed is anticipated as being within the scope of this invention.

The particular material which has been studied in greatest detail is a carrageen extract prepared and marketed by the Phenix Foods Company, 460 East Illinois Street, Chicago 90, Illinois, under the trade name of Kraystay, Type S.

In the following table data are presented which illustrate the remarkable ability of carrageen extract to control fat separation while causing only a slight increase in viscosity of the finished high-temperature short-time sterilized product even at the higher usage levels. Moreover, it should be noted that no gum other than carrageen has so far been found which is effective in accomplishing the desired stabilization of the fat emulsion at concentrations which do not develop excessively high viscosity. In illustration of this point, data on the behavior of two other gums, notably sodium alginate and sodium carboxymethylcellulose (CMC), have been included in the following table for purposes of comparison.

| Evaporated Milk Sample Description | Type of Stabilizer | Stabilizer Level (Percent) | Viscosity at 72° F. (centipoises) | Viscosity at 45° F. (centipoises) | Fat Separation,[1] inches |
|---|---|---|---|---|---|
| Conventional Sterilization | none | | 35 | 86 | 1/8 |
| HTST Sterilized | do | | 10.5 | 29 | 1/4 |
| Do | Sodium Alginate | 0.14 | 40 | 128 | 1/8 |
| Do | CMC | 0.035 | 30 | 92 | 5/32 |
| This Invention | Irish Moss | 0.0075 | 13 | 34 | <1/16 |
| Do | do | 0.01 | 15 | 38 | <1/32 |
| Do | do | 0.015 | 22 | 49 | trace |

[1] Fat separation is expressed in terms of the depth of the fat or cream layer which formed in a conventional 300 x 400 sanitary can during undisturbed storage for a period of one year at 72° F.

In addition to the marked inhibitory effect upon fat separation in high-temperature short-time sterilized evaporated milk and other fat-containing concentrated milk products of greater than normal concentration, I have found that Irish moss is extremely effective in controlling fat separation in remade or recombined high-temperature short-time sterilized concentrated milks. During certain seasons of the year and in certain areas of the world where a natural milk supply is inadequate or unavailable for the manufacture of sterilized concentrated milk products, it becomes advantageous to utilize dried milk powder, dried nonfat milk powder, butter, frozen cream, plastic cream, anhydrous milk fat, and other animal or vegetable fats either alone or in combination for the preparation of sterilized concentrated milk products such as for example evaporated milk or modified (filled) evaporated milk. At the present time, however, this practice is limited for the reason that milk and milk products lose to a substantial degree their natural ability to produce a stable fat emulsion during the drying process, hence the resulting recombined sterilized concentrated milk products undergo fat separation at an accelerated rate. Due to this relative absence of the normal fat emulsion stabilizing factors in such concentrated milk, I have found it advisable to use somewhat higher concentrations of Irish moss for most satisfactory results. In general, I prefer to use concentrations ranging from 0.01 to 0.02 percent by weight and more preferably between 0.012 to 0.016 percent by weight.

In practice, the manner in which the Irish moss is incorporated with the milk product is not critical provided the gum is evenly distributed. The Irish moss can be added in either a hydrated or unhydrated form provided only that if unhydrated it be allowed an opportunity to become properly hydrated either before or during the sterilization step. I have found that the stabilizer can be added to the fluid milk before or after forewarming or to the concentrated milk after evaporation with equal effectiveness. Usually, I prefer to slurry the Irish moss with cool water below 80° to 100° F. in an amount sufficient to provide an approximately one percent concentration, then add the slurry to the fluid or concentrated milk with efficient agitation so as to permit thorough dispersion throughout the mass to be processed. Alternately, the Irish moss may be hydrated in hot water or milk prior to admixture with the main batch of milk or concentrate.

In my co-pending application Serial No. 537,402, filed September 29, 1955, for Process for Preparing Evaporated Milk, I have disclosed methods for carrying out such processes including preheating treatments at high temperatures for short times followed by a cooling step and then HTST sterilization. The process of that application provides evaporated milk products of improved color and flavor. The present invention relating to stable fat emulsion at normal viscosity may be applied in combination with the process of the co-pending application.

*Example 1*

Approximately 10,000 pounds of fluid whole milk was received, standardized as to the desired fat to solids-not-fat ratio of the finished evaporated milk, cooled to approximately 40° F. and stored in an agitator-equipped cold wall tank preparatory to forewarming and evaporation. One-half pound of Irish moss extract (Kraystay, Type S) was added slowly to approximately 75 pounds of cool tap water held in a ten-gallon milk can under high agitation by means of a conventional propeller-type motor-driven agitator mounted on the rim of the can. The resulting slurry was added slowly to the main batch of raw milk at a point of good agitation within the agitator-equipped storage tank and thoroughly stirred throughout the milk for even distribution. The fluid milk then was forewarmed to approximately 240° F. and held at this temperature for approximately 2 minutes before being fed directly into a three-stage evaporator which concentrated the milk to a concentration of about 28 percent total solids. The concentrate was heated to a temperature of 200° F. for 5 minutes for stabilizing against gelation in accordance with my co-pending application Serial No. 537,402, and thereafter it was immediately cooled and standardized by the addition of water to the desired final concentration of 26 percent total solids. The concentrate was continuously sterilized by heating in high-velocity heaters to a temperature of 265° F. for 2 minutes, cooled to 150° F., sterile homogenized at 4000 p. s. i., cooled further to approximately 80° F. and canned aseptically using the Martin aseptic canning equipment. The finished product possessed a viscosity of 13.5 centipoises and exhibited less than one-sixteenth of an inch of fat separation after being stored for twelve months at 72° F.

*Example 2*

In this test fluid whole milk was received and processed as in Example 1 with the exception that the stabilizer slurry was added to the concentrated whole milk at the time of final standardization thereof. Thereafter, the product was sterilized and canned aseptically as previously described. The finished product was found to possess physical characteristics and resistance to fat separation substantially equivalent to that produced under the conditions used in Example 1. It was concluded, therefore, that the heat of sterilization alone is sufficient to bring about those yet unknown reactions between the Irish moss extract and one or more of the milk constituents which are responsible for the marked inhibition of fat separation during storage.

*Example 3*

Upon receiving at the plant, the fluid whole milk was pasteurized, cooled and pre-standardized to the approximate fat to solids-not-fat ratio of evaporated milk. The pooled milk was forewarmed by means of a steam injection heater at a temperature of approximately 245° F. for a period of approximately 2 minutes. Thereafter, the milk was passed directly into a multiple-effect evaporator of conventional design where it was concentrated to a total solids concentration of approximately 27 percent, then cooled to about 40° F. and standardized to the final fat to milk solids-not-fat ratio desired using the water in which the Irish moss extract was slurried as a portion of the water of standardization. In this instance 0.6 pound of Irish moss extract was slurried into approximately 60 pounds of water after which the slurry was added to the approximately 6000 pounds of milk concentrate. The method used in the preparation of the slurry was substantially the same as that used in Example 1. The standardized concentrate then was warmed to approximately 145° F., homogenized at 3500 and 500 p. s. i. to provide a Farrall Homogenization index of 10.0 and cooled to below 50° F. preparatory to filling into conventional vent-hole-type evaporated milk cans. After filling, one portion of this milk was sterilized by means of the conventional in-can sterilization process at about 243° F. for 15 minutes while a second portion was sterilized by means of a high-temperature short-time in-can process at about 260° F. for three minutes. These samples were compared for storage stability with additional samples of conventional evaporated milk and evaporated milk sterilized by the high-temperature short-time in-can process which contained no added Irish moss extract. The processing of these additional samples was identical in all respects to the processing of their counterparts to which Irish moss extract was added. After a storage period of six months at 72° F. it was found that the samples of conventionally processed evaporated milk containing Irish moss extract showed only slightly less fat separation than the conventionally sterilized control whereas the high-temperature short-time, in-can sterilized evaporated milk to which Irish moss extract was added was markedly superior to its control with respect to fat separation; the control sample showing over one-half inch of heavy cream layer compared with less than one-sixteenth inch of cream layer in the sample prepared in accordance with the present process.

*Example 4*

In this test the milk was processed as in Example 1 with the exception that the fluid milk was forewarmed to approximately 200° F. and held at this temperature for approximately 10 minutes.

*Example 5*

In this test the milk was processed as in Example 3 with the exception that the pooled milk was forewarmed at a temperature of approximately 210° F. for a period of approximately 8 minutes.

While I have described certain preferred methods of carrying out the improved process, it is to be understood that it is capable of variation to meet differing conditions and requirements and I contemplate such modifications as come within the spirit and scope of the appended claims.

In construing the claims, it is to be understood that the concentrated liquid milk product constituting the subject-matter of this invention may be prepared directly from fluid milk or may be formed by recombining dry milk solids with water. In addition, it should be understood that it is not material to the invention whether the extract of the seaweed *Chondrus crispus* is added before the milk is concentrated or after the concentration thereof. The same benefits are derived from both procedures.

The term "evaporated milk" as employed herein refers to that milk product which is defined as "evaporated milk" in the definitions and standards for food promulgated under the Federal Foods, Drugs and Cosmetic Act as it appears in the compilation published in the Federal Register on October 30, 1948 (13 F. R. 6377) as amended (13 F. R. 6969).

I claim:

1. The method of preparing stable, homogenized, high-temperature short-time sterilized, concentrated, liquid milk products possessing substantially normal viscosity and a stable fat emulsion, which comprises the addition of an extract of the seaweed *Chondrus crispus* to the unsterilized milk in quantities ranging from approximately 0.0075% to approximately 0.020% by weight of the concentrated milk product.

2. A high-temperature short-time sterilized, concentrated, liquid milk product possessing substantially normal viscosity and having a fat emulsion which has been stabilized by homogenization and the addition of an extract of *Chondrus crispus* in concentrations ranging from approximately 0.0075% to approximately 0.020% by weight of said concentrated, sterilized milk product.

3. A high-temperature short-time sterilized and homogenized concentrated liquid milk product containing from approximately 10% to approximately 30% total milk solids and from approximately 5% to approximately 10% edible fat of animal origin, said fat being present as a stable emulsion, said milk product processing substantially normal viscosity and containing an extract of the seaweed *Chondrus crispus* in concentrations ranging from approximately 0.0075% to approximately 0.020% by weight of said milk product.

4. A high-temperature short-time sterilized and homogenized concentrated liquid milk product containing from approximately 10% to approximately 30% total milk solids and from approximately 5% to approximately 10% edible fat of vegetable origin, said fat being present as a stable emulsion, said milk product possessing substantially normal viscosity and containing an extract of the seaweed *Chondrus crispus* in concentrations ranging from approximately 0.0075% to approximately 0.020% by weight of said milk product.

5. A high-temperature short-time sterilized and homogenized evaporated milk which possesses a viscosity at 72° F. of approximately 25 centipoises or less and which contains an extract of the seaweed *Chondrus crispus* in concentrations ranging from approximately 0.0075% to approximately 0.020% by weight of said evaporated milk.

6. A high-temperature short-time sterilized and homogenized concentrated recombined milk product of evaporated milk composition which contains edible fat of animal origin and which contains an extract of the seaweed *Chondrus crispus* in concentrations ranging from approximately 0.0075% to approximately 0.020% by weight of said milk product, said sterilized milk product having a viscosity at 72° F. of approximately 25 centipoises or less.

7. A high-temperature short-time sterilized and homogenized concentrated recombined milk product of evaporated milk composition which contains edible fat of vegetable origin and which contains an extract of the seaweed *Chondrus crispus* in concentrations ranging from approximately 0.0075% to approximately 0.020% by weight of said milk product, said sterilized milk product having a viscosity at 72° F. of approximately 25 centipoises or less.

References Cited in the file of this patent

UNITED STATES PATENTS

| | | |
|---|---|---|
| 2,087,962 | Ball | July 27, 1937 |
| 2,223,277 | Wilt | Nov. 26, 1940 |

FOREIGN PATENTS

| | | |
|---|---|---|
| 173,697 | Great Britain | Jan. 12, 1922 |

OTHER REFERENCES

"Byproducts from Milk," by Whittier and Webb-Reinhold Publishing Corp., New York (1950), page 28.

UNITED STATES PATENT OFFICE
CERTIFICATE OF CORRECTION

Patent No. 2,845,350                                                                 July 29, 1958

Donald F. Wilcox

It is hereby certified that error appears in the printed specification of the above numbered patent requiring correction and that the said Letters Patent should read as corrected below.

Column 1, line 41, for "sterilizing" read -- sterilized --; column 6, line 13, for "processing" read -- possessing --.

Signed and sealed this 28th day of October 1958.

(SEAL)

Attest:

KARL H. AXLINE                                                    ROBERT C. WATSON
Attesting Officer                                              Commissioner of Patents